(12) United States Patent
Doona et al.

(10) Patent No.: US 10,437,909 B2
(45) Date of Patent: Oct. 8, 2019

(54) METHOD FOR MICROBIOLOGICAL QUASI-CHEMICAL KINETICS GROWTH-DEATH MODELING IN FOOD

(75) Inventors: Christopher J Doona, Oxford, MA (US); Edward W Ross, North Eastham, MA (US); Florence E Feeherry, Wellesley, MA (US); Kenneth Kustin, San Diego, CA (US)

(73) Assignee: Brandeis University, Waltham, MA (US)

( * ) Notice: Subject to any disclaimer, the term of this patent is extended or adjusted under 35 U.S.C. 154(b) by 1535 days.

(21) Appl. No.: 12/551,596

(22) Filed: Sep. 1, 2009

(65) Prior Publication Data

US 2011/0054855 A1    Mar. 3, 2011

(51) Int. Cl.
G06G 7/48 (2006.01)
G06F 17/13 (2006.01)

(52) U.S. Cl.
CPC .................................. G06F 17/13 (2013.01)

(58) Field of Classification Search
None
See application file for complete search history.

(56) References Cited

U.S. PATENT DOCUMENTS

| | | | |
|---|---|---|---|
| 5,096,718 A | | 3/1992 | Ayres et al. |
| 5,811,255 A | * | 9/1998 | Hunter et al. .................. 435/29 |
| 6,107,033 A | | 8/2000 | Welling et al. |
| 7,027,958 B2 | | 4/2006 | Singh et al. |
| 7,171,312 B2 | | 1/2007 | Steinthal et al. |
| 7,491,488 B2 | | 2/2009 | Fleming et al. |
| 2002/0161545 A1 | | 10/2002 | Starling et al. |
| 2002/0163436 A1 | | 11/2002 | Singh et al. |
| 2002/0193970 A1 | | 12/2002 | Singh et al. |
| 2003/0005710 A1 | | 1/2003 | Singh et al. |
| 2004/0054506 A1 | | 3/2004 | Singh et al. |
| 2004/0060305 A1 | | 4/2004 | Singh et al. |

OTHER PUBLICATIONS

Doona et al. "A quasi-chemical model for the growth and death of microoganisms in foods by non-thermal and high-pressure processing," (International Journal of Food Microbiology, vol. 100 (2005) pp. 21-32).*

Doona et al., "Chapter 6, The Quasi-chemical and Weibull Distribution Models of Nonlinear Inactivation Kinetics of *Escherichia coli* ATCC 11229 by High Pressure Processing," (High Pressure Processing of Foods, 2007, Chapter 6).*

Ross et al., "The mathematical properties of the quasi-chemical model for microoransim growth-death kinetics in foods," (International Journal of Food Microbiology, vol. 99 (2005) pp. 157-171).*

Taub et al. "A Quasi-Chemical Kinetics Model for the Growth and Death of *Staphylococcus aureus* in Intermediate Moisture Bread," (Food Microbiolgy and Safety, vol. 68 (2003) pp. 2530-2537).*

Christopher S. Doona et al., A quasi-chemical model for the growth and death of microorganisms in foods by non-thermal and high pressure processing, *International Journal of Food Microbiology* 100 (2005) 21-32.

E.W. Ross et al., The mathematical properties of the quasi-chemical model for microorganism growth-death kinetics in foods, *International Journal of Food Microbiology* 99 (2005) 157-171.

I.A. Taub, et al., A Quasi-Chemical Kinetics Model for the Growth and Death of *Staphylococcus aureus* in Intermediate Moisture Bread, *JFS: Food Microbiology and Safety*, vol. 68, Nr. 8, 2003.

* cited by examiner

*Primary Examiner* — Anna Skibinsky
(74) *Attorney, Agent, or Firm* — Quarles & Brady LLP

(57) ABSTRACT

A food safety management tool that utilizes a mathematical model based on differential equations that is generalized for describing the continuous growth-death kinetics of microbial populations in foodstuffs. The method is used to provide a way to control target microorganisms when designing product formulations of minimally processed foodstuffs or when processing foods with high pressures, temperatures, or other lethal agents to achieve effective pasteurization, disinfection, or sterilization of foodstuffs, and includes the use of model parameters to predict food formulations to inhibit the growth of microorganisms and the processing times needed to reduce microbial hazards to levels that ensure consumer safety.

17 Claims, 6 Drawing Sheets

| Reaction steps | Rate functions | Rate equations |
| --- | --- | --- |
| $Q \rightarrow M$ | $v_1 = k_1 Q$ | $dQ/dt = -(v_1 + v_5) = -(k_1 + k_5)Q$ |
| $M \rightarrow 2M + E$ | $v_2 = k_2 M$ | $dM/dt = v_1 + v_2 - v_3 - v_4 = k_1 Q - M(G - \varepsilon E)$ |
| $M + E \rightarrow D$ | $v_3 = k_3 ME$ | $dE/dt = (v_2 - v_3) = M(k_2 - \varepsilon E)$ |
| $M \rightarrow D$ | $v_4 = k_4 M$ | $dD/dt = (v_3 + v_4 + v_6) = M(k_4 + \varepsilon E) + k_6 R$ |
| $Q \rightarrow R$ | $v_5 = k_5 Q$ | $dR/dt = v_5 - v_6 = k_5 Q - k_6 R$ |
| $R \rightarrow D$ | $v_6 = k_6 R$ | |

FIG. 1

METHOD FOR MICROBIOLOGICAL QUASI-CHEMICAL KINETICS GROWTH-DEATH MODELING IN FOOD

BACKGROUND OF THE INVENTION

1. Field of the Invention

The present invention generally relates to the field of predictive models for ensuring the microbiological safety and extended shelf life of foods and, more particularly, to a Quasi-chemical mathematical modeling method which is utilized as a tool for predictive microbiology evaluation of microorganism population dynamics based on an understanding of chemical reaction pathways that are intrinsic to these organisms in support of the safe design of food product formulations and food processing conditions.

2. Description of the Related Art

To develop effective predictive models that assure the microbiological safety and extended shelf life of foods, it is essential to know how bacterial populations grow and die in response to the factors influencing a food product where nutrients are generally non-limiting. Intrinsic factors of the food include physical properties, such as pH, water activity, salinity, and the presence of anti-microbial constituents. Extrinsic factors generally refer to properties of the external environment, such as storage temperature, relative humidity, ambient pressure, and applied processing conditions, all of which influence microbial survivability.

Early investigators faced with the problem of analyzing bacterial population dynamics turned to equations developed previously developed from theories of treating human and animal population dynamics in their effort to model microorganism growth curves and death curves. These models were characterized by parameters, such as per capita birth rate and sustainable population, which are clearly inappropriate and uninformative for describing the growth and death of unicellular microorganisms. It was not obvious to these early modelers that such observed features of bacterial population growth and decline data could be analyzed and evaluated in a manner that reflects the underlying biochemical and biological bases of these changes.

One early known application of chemical reactions involving molecular species that can be used to model the complex and emergent macroscopic behavior of entire organisms involves the Lotka-Volterra model of predator-prey population dynamics. This model consists of three irreversible chemical reactions. The variables are x (i.e, the population of hares (prey)), and y (i.e., the population of lynxes (predator)). The reactions and their differential rate equations comprise autocatalytic growth of the hare population feeding on a constant supply of grass, autocatalytic growth of the lynx population feeding on hares, and a first-order death of lynxes. Solutions of the model predict oscillations in the two populations of lynx and hare that lag behind each other. In a microbiological application of the Lotka-Volterra model, studies of controlled laboratory populations of mixed infusions of *Paramecium aurelia* (predator) and *Saccharomyces exiguns* (prey) exhibit these same properties of oscillation and lag. The use of the Lotka-Volterra model is therefore unsuitable for providing accurate estimates of biologically-relevant kinetics parameters for use in predicting conditions to assure the microbiological safety of foods.

The Quasi-chemical model is a mechanistic-based mathematical model that applies appropriate sequences of chemical reactions or biochemical processes to more accurately and meaningfully represent the molecular mechanisms of bacterial anabolism, catabolism, cellular signaling (i.e., Quorum sensing), and lethality that result in growth-death behavior and offers several technological advantages over anthropomorphic models invoked by early investigators, as mentioned above, or other empirical models currently in use.

In Predictive Microbiology, predictive models provide food technologists and non-mathematical experts with convenient food safety tools to determine the survivability of microorganisms in response to food formulations designed to control growth or in response to process conditions intended to limit or destroy pathogenic bacterial populations wherever they may originate. The data characteristic of bacterial population dynamics are collected, categorized, and referred to in terms of quantitative parameters (e.g., lag time, growth rate, etc.) using mathematical models or equations. Workers skilled in this art are expected to use this information to predict how or whether the population will evolve in time, particularly for conditions not used in the construction of the model.

Once a target microorganism has been identified as a hazard associated with a specific food or food class, whether a vegetative bacterial pathogen, bacterial spore, spoilage organism (yeasts and molds), virus, or fungus, prion, or ascospore, its changes in population size will be influenced by intrinsic and extrinsic factors. If the food product is formulated as a minimally processed foodstuff, then the data for this purpose are collected directly by inoculating the foodstuff under a variety of conditions (various formulations and storage conditions) and sampling the population at timed intervals. Similarly, for canned or packaged food products that are intended for exposure to harsh, lethal processing treatments (e.g., heat, known as thermal processing, canning, or retorting), the extent of microbial inactivation in the inoculated foodstuff is determined by sampling at timed intervals of exposure to the lethal processing treatment until its safety is reliably assured.

For purposes of evaluation and categorization, the preferred dynamical data is obtained by enumerating the bacterial population size at selected time intervals using plate-counting or other such techniques. Bacterial populations are often sufficiently large (on the order of $10^9$ colonies per g or per mL in units of CFU/g or CFU/mL) to afford reproducible measurements and meaningful statistics, although they do not approach the enormous sizes of individual molecules in chemical systems (on the order of Avogadro's number $N_A=6.023\times10^{23}$). The method of the present invention of the Quasi-chemical mathematical model yields precisely those parameters that enable the model to be predictive as well as descriptive.

In the nutrient-rich environment of food, bacteria and other organisms tend to exhibit a characteristic pattern called the microbial lifecycle. The bacteria or other organisms can survive or be stimulated to grow after a relatively quiescent initial period with a relatively slow growth rate that generally produces only a small or modest increase in population (called the lag phase). As the bacteria metabolize and reproduce, the growth rate increases dramatically, leading to a relatively sudden increase in population size (called the exponential growth phase). The rate of growth then declines asymptotically to zero, and the population increases in number until the population density reaches an approximately constant maximum stationary value (called the asymptotic or stationary phase). However, this so-called stationary phase is not a true steady-state. Rather the stationary phase is indicative of a microbial population in which the rates of growth and death approximately cancel. As the bacterial population ages further, nutrients deplete and excreted metabolic waste products accumulate in the surroundings, and eventually the population density declines due to natural effects (called the death phase).

Conventional methods involve the fitting of bacterial population curves based on treating the population-time curve as an assemblage of recognizable and separable stages of stasis, increase or decrease. Experimental conditions may actually be arranged to separate growth and inactivation responses by the target microorganism population, and distinctly different models have been applied to evaluate the kinetics of each type of response. Specifically, in known methods, data collected during the first phases of population dynamics (lag through stationary phases) are called growth studies. Typically, a food product is inoculated to a low level with the target pathogen, and the inoculated, nutrient-rich food is packaged and stored in a relevant environment characteristic of the actual handling of the product by distributors and consumers. The growth of that organism is measured as a function of time until the maximum cell population is reached and maintained for some unspecified duration. In some food formulations over the range of conditions tested experimentally, only death of the microorganisms may be observed (i.e, an inactivation plot).

Growth kinetics data is typically evaluated using empirical S-shaped (sigmoidal) expressions. While these sigmoidal equations provide reasonable estimates of growth behavior and food shelf-life, they are flawed, because they subjectively remove data showing a decline after the stationary phase. However, the declining or so-called death data influences the estimated values of the sigmoidal curve-fit parameters determined from the growth curves (e.g., growth rates) that are used to estimate the safe, stable shelf-life of the product. In other types of studies, a food product is inoculated to relatively high levels with a target organism, and then subjected to the extreme conditions of an external intervention intended to kill the target organism (e.g., thermal processing, high pressure, pulsed electric field, irradiation, chemical agents, UV light, etc.) by a food processing technology. For such studies, the bacterial population size shows only a decline (i.e., an inactivation plot) from its original inoculated value. In the known methods, the treatment of this type of data is most commonly performed with a first-order decay equation.

Conventional methods perform a selection from among many different, unrelated empirical equations for modeling growth or death kinetics. Models based on sigmoidal functions are used to fit the growth portion of the curves, and a modified version of a sigmoidal function, or a different function, must be chosen to separately model microbial populations showing death-only kinetics. A choice among empirical mathematical functions such as the Weibull distribution model or the logistic equation must be made to provide a fit to either the growth portion or the death portion of the data. Known methods preferably utilize the actuarial Gompertz equation to fulfill this function for growth modeling. The Gompertz equation, and more sophisticated versions of it, have been widely used and have been made available in the United Kingdom (Food MicroModel), for example, and in the United States by the Department of Agriculture (Pathogen Modeling Program) for growth modeling. Because of the wholesale use of the Gompertz equation for growth curves, an equation leading to a curve of similar form, but one that displays a decline not an increase, was sought for death curves. Such equations include an inverse Gompertz function or a Fermi distribution function for atomic density. The complex pattern of full growth-death curves is conventionally treated in a piecewise or discontinuous manner by combining a growth equation and a death equation to yield a single empirical expression that can be used to fit the entire growth-death curve. Such an approach has been used in instances of food fermentations for the production of wine or table olives, and in bio-reactor technologies where nutrients deplete due to bio-mass conversion. In the case of thermal food processing, models such as first-order chemical or radioactive decay equations are often used.

The foregoing description is represented by those skilled in this field as log-log plots of cell density against time, which depict temporal changes in population density in a closed system and is characterized by the four phases: lag, exponential growth, stationary, and death. This known methodology is flawed, however, because there is no provision of the biochemical steps underlying the bacteriological life-cycle when modeling population dynamics. The known methodologies are further flawed in their application, because the models do not fit the entire growth/death data cycle as a continuum, which it actually is. Instead, the known methodologies resolve the population curve into a series of disconnected phases, some of which are re-combined and fitted by the application of separate models. The mathematical functions used to simulate curves so conceived contain parameters that characterize portions of the population-time curve as discontinuous segments.

It is therefore known to use separate and discontinuous models to represent different regions of the response curve, which, when considered in its entirety, is a continuous dynamical process. The "fit" to each phase or region is therefore only approximate. The skilled person has recognized these shortcomings and has attempted to make improvements, but without changing the basic population dynamics approach. In applications to individual strains of bacterial spores, such as *Clostridium botulinum*, separate expressions for the different types of response to different conditions have been combined into a single equation. Three so-called phases, i.e., lag, growth, and death, are arbitrarily assigned exponential dependences of population on time, and the exponentials are assembled to form a function that fits the entire curve. A further choice is also known: an equation independent of any physical, chemical, or biological model. For example, the growth-decline curve can be fit with a polynomial regression equation. Artisans having the ordinary level of skill in the field of curve-fitting have recognized that the Gompertz equation could be improved, and have introduced a 4-parameter Gompertz equation in attempts to do so. However, even with this modified Gompertz model, the initial or lag phase is poorly modeled. A linear increase in the logarithm of a population [log(CFU/mL)] is often observed during experiments, but the Gompertz equation is one that continually curves and, therefore, the Gompertz fitting process generally yields an approximate fit that overshoots (i.e., provides values slightly above) and undershoots (i.e., provides values slightly below) the experimental data If Gompertz equations are combined to fit growth and death separately, it then becomes necessary to estimate eight parameters plus a parameter for the time at which the two functions are to be combined.

The advent of novel, non-thermal food processing technologies in recent years, such as high pressure processing, to minimize the over-processing of food compared with thermal processing, which itself can compromise the organoleptic properties of food, induce nutrient degradation and diminish food quality, have re-opened the need to examine alternative non-linear models to ensure the safety of foods for consumers. High pressure processing can inactivate foodborne vegetative bacterial pathogens, resistant bacterial spores, viruses, prions, and ascospores under appropriate processing conditions. The microbial inactivation data does not strictly adhere to linear kinetics, often producing non-linear inactivation kinetics for a range of processing conditions, foodstuffs, and target organisms. Consequently, the linear (i.e., first-order) model commonly used with microbial inactivation by thermal processing is unsuited for complex inactivation kinetics, including those observed with non-thermal processing methods. Despite the widespread acceptability of standard sigmoidal equations in commercial practice for ensuring the safety of foods, a single empirical model can not accommodate the entire range of non-linear inactivation kinetics observed with non-thermal food processing, while providing parameters with meaningful insight into the biochemical mechanism of the observed behavior.

It is thus evident that non-linear models with enough versatility so as to capably reproduce the entire array of complex kinetics patterns observed in microbial growth in minimally processed foods or in the inactivation of microorganisms by high pressure and other non-thermal processing technologies are needed to ensure the safety of foods controlled or processed with these technologies. To make accurate predictions of microbial growth or destruction in such circumstances requires the models to have correct structures with meaningful parameters, so that such models can accurately describe the non-linear kinetics and produce parameter values with good statistical quality to improve the accuracy of the estimates of microbial inactivation.

It is therefore apparent there is a need for an improved model to provide more accurate nonlinear (e.g., growth-decline and death-only) curve fits and more relevant modeling parameters for observed microbiological population dynamics.

The mechanistic-based, enhanced 6-parameter Quasi-chemical model is derived from the mathematics of ordinary differential equation systems, and represents a single model structure, which without necessitating modification, can accommodate continuous growth-death-tailing kinetics of microorganisms in minimally processed foods, without subjectively removing data points to evaluate growth curves. The Quasi-chemical model can accommodate linear death-only kinetics and a range of nonlinear inactivation kinetics patterns in either minimally processed foods or foods processed with heat or non-thermal technologies, such as the emerging technology of high pressure processing. In cases where the observed kinetics can show non-linearities, such as lag times (or shoulders) and/or tailing, the data are not amenable to solution by linear models or by the conventional 4-parameter Quasi-chemical model that can not account for tailing in the observed kinetics.

SUMMARY OF THE INVENTION

Disclosed is the application of concepts and methods of chemical kinetics and mechanisms to the bacterial lifecycle, to model the macroscopic dynamical behavior of the population of a colony of such individuals to ensure the safety of foods through an enhanced, 6-parameter predictive microbiology tool for managing food safety, i.e., the Quasi-chemical model.

A set of chemical reactions is created to present the mechanistic-based Quasi-chemical primary (1°) model, in which each chemical reaction represents a selected essential biochemical process governing microbial responses during its lifecycle. The temporal behavior of each reaction is then expressed by a differential rate equation. A numerical integration of a set of coupled differential equations forming a biomolecular basis of the model is performed to produce a curve of population verses time that can fit an experimental collection of such data. Parameters are provided to practitioners engaged in the art of predictive modeling for food safety, such as lag time ($\lambda$), specific growth rate ($\mu$) in cases of growth, specific death rate ($-\mu$) in cases of death, and processing times (tp), which is defined as the estimated time that is required to achieve a specified level of kill (e.g., a 6-log kill). The mathematical interrelationships of the model's parameters {i.e., lag time ($\lambda$), specific growth rate ($\mu$), and processing times (tp)} to the environmental conditions (e.g., water activity, pH, gaseous atmosphere, and storage temperature for minimally processed foods; applied hydrostatic pressure and processing temperature for high pressure processing) produce predictive secondary (2°) models and additional parameters called coefficients that govern those relationships. Workers skilled in this art are expected to use this information to predict the safety of foods from target organisms, especially for conditions not used in the construction of the model.

Certain chemical reactions are known to possess complex mechanisms that give rise to oscillations and spatial inhomogeneities (i.e., pattern formation in unstirred reactors). Models have been successfully developed to fit and explain these phenomena. Two such reactions and their models are the Belousov-Zhabotinsky (BZ) reaction between bromate and an organic acid catalyzed by a strong oxidant, modeled by the Oregonator mechanism, and the reaction between chlorine dioxide, iodine and malonic acid (CDIMA) modeled by the CDIMA mechanism. These rigorous chemical kinetics models have been adapted to fit and explain such complex biological phenomena as cardiac oscillations and arrhythmias, Turing structures, coat patterns of developing animals, and the transition from a random collection of unicellular organisms to a single well-organized multicellular organism in the slime mold *Dictyostelium discoideum*.

The Quasi-chemical model is used to perform an analysis of growth-death-tailing and linear or nonlinear death-only curves of microorganisms in foodstuffs during storage or upon exposure to environmental stresses, such as elevated temperatures and pressures during processing. Due to the heterogeneity of the individuals in the microbial population, some segments of the population may exhibit increased resistance in response to these stresses, such as superdormant bacterial spores or baro-tolerant (i.e., pressure-resistant) vegetative cells. In terms of population curves, this response is manifested by a decreasing steepness of the death portions of the curves, and the tendency to approach a non-zero (i.e., much higher) population asymptote. This phenomenon is known as "tailing." All kinetics patterns that arise in the control of microorganisms are therefore accommodated by the 6-parameter Quasi-chemical model to ensure food safety. It should be noted that parsimonious versions of the Quasi-chemical model containing fewer than 6 parameters can be used to evaluate microbial kinetics curves showing patterns less complex than continuous growth-death-tailing without departing from the scope of the present invention.

Based on the disclosed complex chemical reactions mentioned above, the disclosed invention permits simulation of a microbial population curve, which is a microbial lifecycle model consisting of five variables, six reactions and their related rate parameters and rate equations. The rate equations are conventional differential equations containing one or more of the variables and rate parameters that are analogous to chemical reaction rate constants. The variables and rate parameters have only positive values.

In accordance with the disclosed invention (FIG. 1), the population of quiescent microbial cells is represented by the symbol Q, and the population of microbial cells activated for cell division and multiplication is represented by the symbol M. Reaction 1, Q→M, represents the change from quiescence or dormancy to active cell division. Reaction 2, M→2M+E, derives its form from chemical autocatalysis. Reaction 2 accounts for population growth and for the formation of extracellular products at least one of which, represented by symbol E, is an extracellular lethality factor. Reaction 3, M+E→D, is a type of cell-signaling interaction (the phenomenon known as Quorum sensing) between the active, multiplying cell type M and the extracellular lethality factor E such that a dead cell, D, results. Reaction 4, M→D, is the intrinsic, non-interactive cell death. Subpopulations of resistant cells are represented by the symbol R. Reaction 5, Q→R, denotes the presence or formation of this group of cells having increased resistance, and reaction 6, R→D, represents the inactivation of the species R.

Six rate functions ($v_1$, $v_2$, $v_3$, $v_4$, $v_5$, $v_6$) are defined to conveniently express the changes in microbial population, analogous to the methods of chemical kinetics. Rate functions $v_1$, $v_4$, $v_5$ and $v_6$ are analogous to first-order chemical reaction rate equations, i.e., $v_1=k_1Q$, $v_4=k_4M$, $v_5=k_5Q$ and $v_6=k_6R$. When applied to changes in M, rate function $v_2$ is analogous to an autocatalytic rate equation, $v_2=k_2M$. Rate function $v_3$ is analogous to a second-order chemical reaction, $v_3=k_3ME$. Combinations of rate functions are used to express the rate equations for the five variables. For example, the rate of change of E, $dE/dt$, is given by $dE/dt=v_2-v_3$.

To facilitate computation and comparison with data, the following additional quantities prove useful. Numerical solutions of the rate equations can be obtained with high efficiency only if the model utilizes a scaling factor, $h=1\times 10^{-9}$ in the second-order rate function, $v_3$. The parameter $\varepsilon$, related to the scaling factor, is defined as $\varepsilon=hk_3$. The net natural growth rate, G, is defined as $G=k_2-k_4$. Such an expression represents the excess of the growth rate over the intrinsic death rate. Because microbial plate counts do not distinguish quiescent and dividing cells, the quantity $U=Q+M+R$ is introduced and used to represent the changes in observed microbial population size.

Other objectives and advantages of the invention, including the interrelationships between population variables, microorganism components, and environmental factors, the behavior of the system at different time frames, parameter and quality of fit estimation, and behavior of the system at parameter extrema will become apparent from the following detailed description considered in conjunction with the accompanying drawings and diagrams. The principles and features of the invention may be used in various different embodiments without departing from the scope of the invention. It will be understood that the particular method selected to embody the invention is shown by way of illustration only and is not a limitation of the invention.

BRIEF DESCRIPTION OF THE DRAWINGS

The various features, functions and advantages characterizing the invention will be better understood by reference to the detailed description which follows, taken in conjunction with the accompanying drawings, in which:

FIG. 1 is a table illustrating reactions, rate functions, and rate equations that define the Quasi-chemical kinetics model.

DETAILED DESCRIPTION OF THE EXEMPLARY EMBODIMENT

Models based on chemical reaction network kinetics can provide more meaningful insight into the mechanisms controlling microbial behaviors and produce more accurate growth-death curve fits and parameters than is possible with anthropomorphic, atomic physics, or empirical (i.e., non-mechanistic) equations. In accordance with the disclosed invention, a Quasi-chemical kinetics method is implemented to facilitate such a mechanistic (or "Quasi-chemical") model.

The disclosed invention is based on the concept that chemical reaction processes involving molecular species can be used to model the complex and emergent macroscopic kinetics behavior of entire organisms. This concept has been successfully used in a variety of contexts. To date, however, there are no known methods for fitting bacterial growth-death curves in the manner achieved in the disclosed invention. The use of the Lotka-Volterra model is unsuitable for providing accurate estimates of biologically-relevant kinetics parameters for use in predicting conditions to assure the safety of foods.

In an exemplary embodiment of the invention, a mathematical model and regression analysis procedure is used to determine accurate estimates of biologically-relevant kinetics parameters that can be used to predict conditions assuring the safety of foods, where the mathematical model is based on a set of ordinary differential equations derived from the mechanism proposed as a series of interrelated chemical steps, as shown in FIG. 1.

Accurately predicting microbial growth rates in response to storage temperature or its changes is important for controlling food safety and food spoilage and requires correct model structures and methods for reliably estimating parameter values with good statistical quality.

Figure 2:
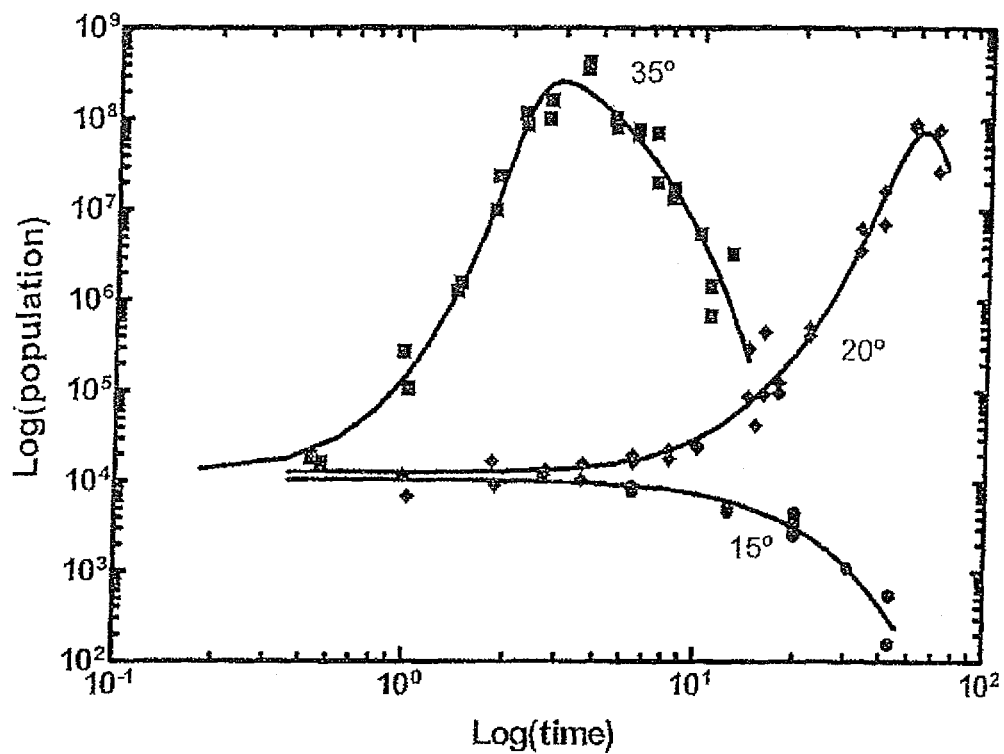
FIG. 2 is a log-log graphical plot of *S. aureus* populations in bread (CFU/mL) against time at temperatures: ■35° C., ♦20° C., and ●15° C.

FIG. 2 is a log-log graphical plot of *Staphylococcus aureus* (*S. aureus*) populations in bread (CFU/mL) against time at different constant storage temperatures, where the symbol ■ shows the graphical plot at a constant storage temperature of 35° C., ♦ shows the graphical plot at a constant storage temperature of 20° C. and the symbol ● shows the graphical plot at a constant storage temperature of 15° C. With specific reference to FIG. 2, one data set consists of a series of three representative nonlinear kinetics data of a population of *S. aureus* inoculated in bread that was packaged and stored at three different temperatures. Population counts are presented as log-log plots of cell counts against time to show continuous growth-death kinetics data (points for T=35° C. and T=25° C.) or nonlinear death-only kinetics (points at T=15° C.) as fitted with the Quasi-chemical model (solid line). It is appreciable from the graphical plots depicted in FIG. 2 that temperature affects the population dynamics of the microorganism S. aureus growing in bread. At 35° C., the so-called lag phase is relatively short (<1 day), and S. aureus growth enters the exponential growth phase soon after inoculation. The population reaches a maximum at approximately three days after inoculation and then declines. At the lower temperature of 20° C., the onset of exponential growth is delayed ($\lambda=5$ days), and the population maximum is not exhibited until approximately 54 days after inoculation, whereupon the population declines. At the lowest observed temperature of 15° C. exponential growth is not observed. At this lowest temperature, the curve shows a lag time ($\lambda=4$ days) then a decline in population. It is thus apparent, that the Quasi-chemical model fit a smooth curve for each data profile shown, thereby demonstrating the versatility of the Quasi-chemical model in accounting for a range of growth-death kinetics and nonlinear death-only kinetics patterns. In both cases, the Quasi-chemical model reproduces the experimentally observed kinetics when fitting the data, and the fit does not infer or enforce the presence of phenomena that otherwise were not observed.

Figure 3:
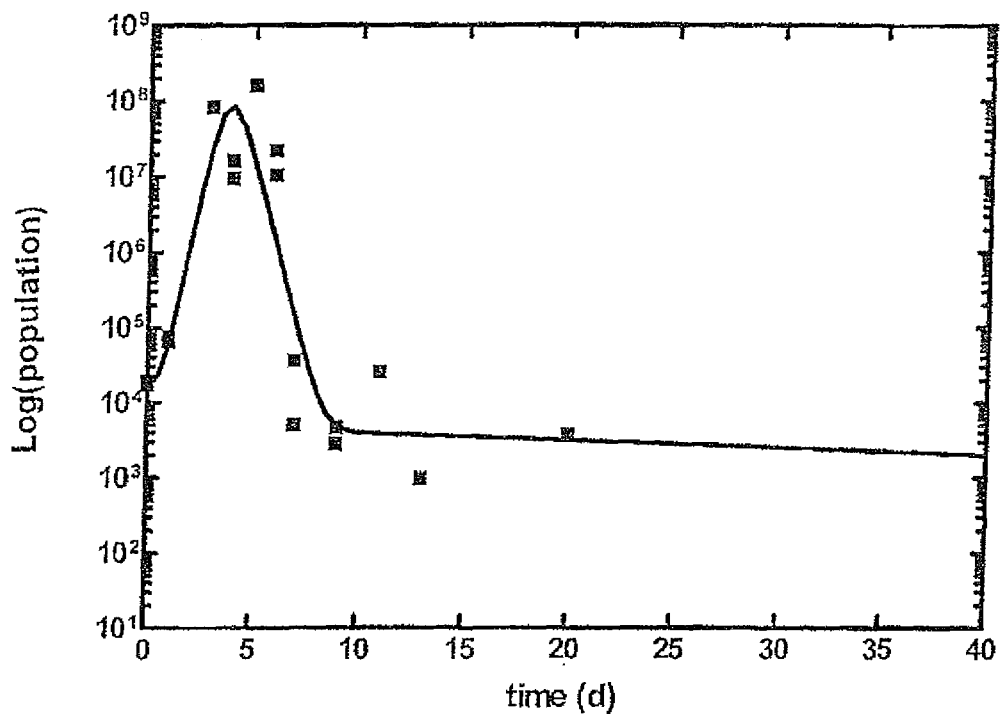
FIG. 3 is a log-log graphical plot of data of *S. aureus* (CFU/mL) inoculated in intermediate moisture ham data and fitted with the Quasi-chemical model and exhibiting continuous growth-death-tailing behavior.

The 6-parameter, "enhanced" version of the Quasi-chemical model represented in the table shown in FIG. 1 is capable of accurately fitting even more complex kinetics data. For example, FIG. 3 is a semi-log graphical plot of data of S. aureus (CFU/mL) inoculated in intermediate moisture ham exhibiting continuous growth-death-tailing behavior as fitted with the Quasi-chemical model. Herein illustrated, the experimental data (solid squares) are typical of growth-death data, as discussed above, where the data shown in FIG. 3 exhibits a brief lag time ($\lambda<1$ day), exponential growth to an asymptotic maximum ($\sim10^8$ CFU/mL at day 5), then a decline in the experimentally determined S. aureus counts that fell below the level of the initial inoculum ($10^4$ CFU/mL by day 10) and persisted at that level for the remainder of the experimentally measured regime. Additional data points were not taken beyond 20 days of isothermal storage. In this case, the Quasi-chemical model (i.e., the plot along the solid line) is capable of accurately fitting the entire set of growth-death-tailing kinetics data. Additionally, the fitted curve extends beyond the experimental domain and demonstrates a gradual recession in the death rate until reaching, like the data collected in that regime, a minimal threshold value representative of the phenomenon of tailing.

The exemplary illustration demonstrates two important conclusive points. First, the 6-parameter Quasi-chemical model (FIG. 1) is capable of accurately modeling complex microbial inactivation kinetics that may include non-linear patterns, such as continuous growth-death-tailing scenarios. Microbial inactivation kinetics often reveal tailing, particularly in the inactivation kinetics of bacterial spores or the inactivation kinetics of L. monocytogenes by high pressure processing. The second conclusive point the exemplary illustration demonstrates is that the model fits and describes the data as it presents itself, and the model does not force the data to conform to any prescribed patterns based on a priori assumptions imposed by the model or the modeler. In an alternative embodiment, more parsimonious versions of the Quasi-chemical model with fewer free parameters are used to accommodate kinetics behaviors less complex than continuous growth-death-tailing. These model versions do not compromise accuracy, and are embodiments of the Quasi-chemical model without departing in scope from the disclosed contemplated embodiments.

Practitioners engaged in predictive modeling for food safety understand that evaluating the fitted curve produced by the model produces estimated values for kinetics parameters, such as lag time ($\lambda$), specific growth rate ($\mu$) in cases of growth, specific death rate ($-\mu$) in cases of death, and processing times ($t_p$), which is defined as the estimated time that is required to achieve a specified level of kill (e.g., a 6-log kill). These kinetics parameters can be related to environmental conditions (e.g., pH and water activity for minimally processed foods, or hydrostatic pressure and temperature for high pressure processed foods) often through linear expressions with additional parameters called coefficients based on the statistical quality of the fit. Moreover, relationships of kinetics parameters and environmental conditions are secondary) (2°) models. The disclosed method permit workers skilled in Predictive Microbiology to use this information to predict food formulations to inhibit microbial growth or processing conditions to ensure microbial destruction and assure consumers.

Figure 4:
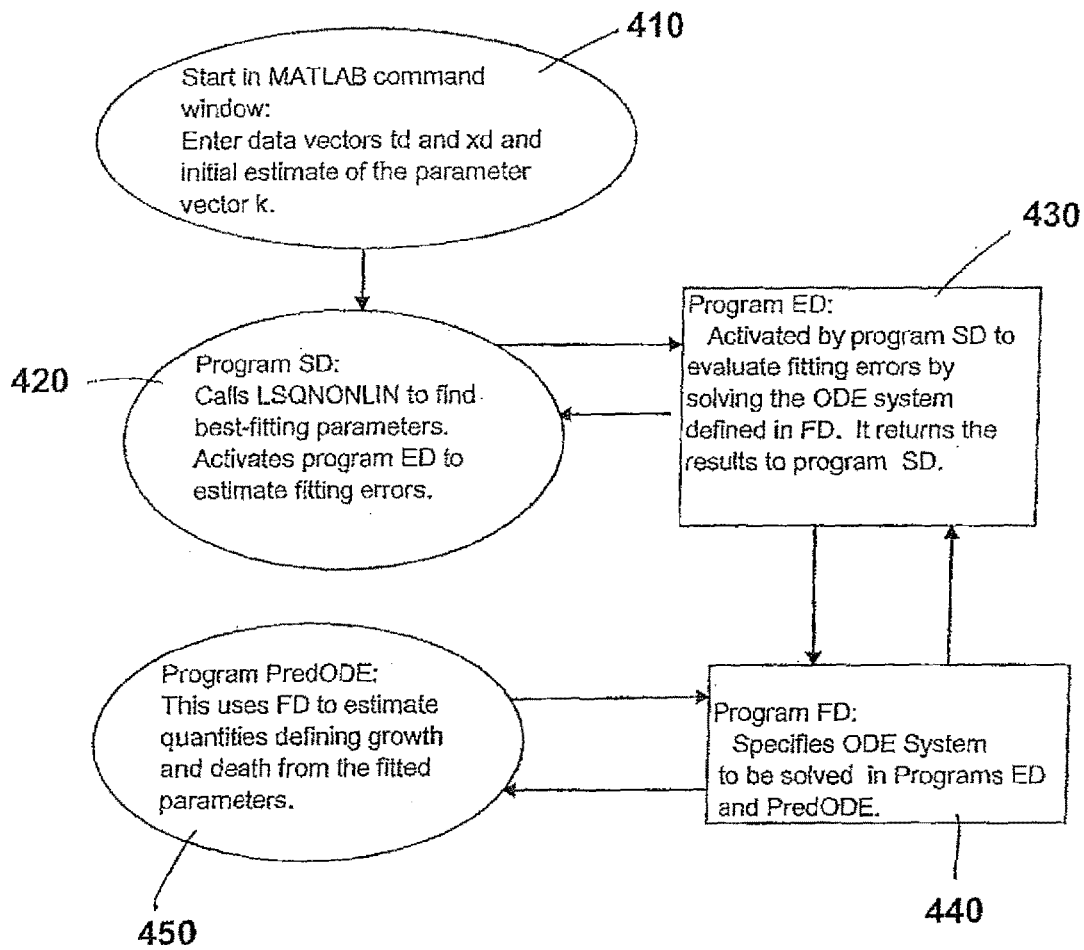
FIG. 4 is an exemplary flow chart illustrating the method of the invention.

The Quasi-chemical kinetics model is applied to fit the typical data in FIG. 2 and FIG. 3 in the following manner, beginning, for example, with the data in FIG. 2 at a temperature equal to 35° C. FIG. 4 is an exemplary flow chart illustrating the steps of the method of the invention, where experimentally measured data pairs are entered into computer memory by the user, as indicated in step 410. Here, the user types in numerical values as a vector of different times (e.g., td) and as a vector of corresponding population counts (e.g., xd). Initial values of six rate-constant estimates are entered by the user, where the values are entered as a six-valued k-vector. In the present exemplary illustration, the rate constant estimates are set equal to unity (i.e., 1). With specific reference to the flow chart shown in FIG. 4, it is seen that step 410 is illustrated in the oval with a label "Start in MATLAB® command window". MATLAB® is a high-level language and interactive environment that enables the performance of computationally intensive tasks faster than with traditional programming languages, such as C, C++, and Fortran. It should be understood that MATLAB® is one example of any one of a number of commercially available interactive computing programs that accomplish curve-fitting, numerical integration, statistical analysis, and graphical visualization of the data and results. It is therefore not the intention to limit the method of the invention to one in which only MATLAB® is used to accomplish curve-fitting, numerical integration, statistical analysis, and graphical visualization of the data and results.

Returning to FIG. 4, the user types and enters "SD" at the command level to cause initiation of "Program SD", as indicated in step 420. The program then instructs the software to select a nonlinear curve-fitting routine. In this illustrative example, the MATLAB® function is called, which activates a second exemplary program called "ED" that instructs the MATLAB® software to select a numerical integration routine. In the present illustrative example, the MATLAB® function is assigned a name, such as "odel5s", which solves conventional differential equations. The Quasi-chemical kinetics model to be solved is stored in memory or media as, for example, program "FD". After entry of the data vectors and the program call, no further user action is required.

With reference to FIG. 4, the differential equation solver called by program ED utilizes the selected solver, e.g., MATLAB® to integrate the model stored as program FD with a first set of rate constants, as indicated in step 420. The result is a calculated population, U, which can be compared with the experimentally measured data (xd) by the MATLAB® software program, i.e., the "lsqnonlin" command provided in MATLAB®. Previous k-values are then changed by lsqnonlin to minimize the differences between measured and calculated values for all the data pairs. The method is repeated until a predetermined fitting criterion is reached, which signifies no further meaningful improvement, i.e., an optimal fit has been achieved. In the present exemplary method, integration, comparison, change and re-integration are continually repeated. The result achieved in this manner is provided by program ED to program SD, as indicated in step 430. The user is thus automatically provided with (1) a log-log (or log-time) graphical plot of the measured experimental data pairs, (2) on the same graphical plot, a log-log plot of the calculated values at the same times (td) as the experimental data points in the form of a dashed straight-line drawn through the calculated points, (3) a listing of the six k-values that were used to generate the fitted curve, and (4) an estimate, S, of the overall error in the fitting. This information is displayed to the user in a manner and style which may be changed or varied. It is to be understood that the skilled person readily understands how to display graphical plots and numerical data on a computer screen and, therefore, this information has not been shown.

In order to obtain a smoother calculated curve, additional statistical data, and predicted values of the population at any time, the user can enter the command "PredODE", as indicated in step 440. By typing and entering PredODE at the command level, a new graphical plot is thus obtained. The data in symbol form is again presented, but the plot of the curve that passes through the displayed data points exhibits fewer abrupt discontinuities than that provided by program SD, by virtue of computing sufficient population-time pairs to generate a smoother spline-fit curve through these more numerous calculated points. Before entering PredODE, however, the quantities tmax (e.g., longest time) and dt (e.g., time increment) must be entered into a command window that is provided (not shown) along with a value V. The time, Tm, at which log (U) attains the value V is then calculated. The disclosed method of the invention thus permits analysis of a complete microorganism population, as indicated in step 450.

Returning to FIG. 2, the data at the temperature 35° C. is exemplary. However, it should be understood that the method of the invention is applicable to any and all such population data. Therefore, the data at the two remaining temperatures shown in FIG. 2, i.e., 20° C. and 15° C., and FIG. 3 were analyzed utilizing the method shown in FIG. 4, in the manner explained above. The additional curves shown in FIG. 2 and FIG. 3 were then constructed by applying these steps of the method to the data at the two lower temperatures.

Figure 5:
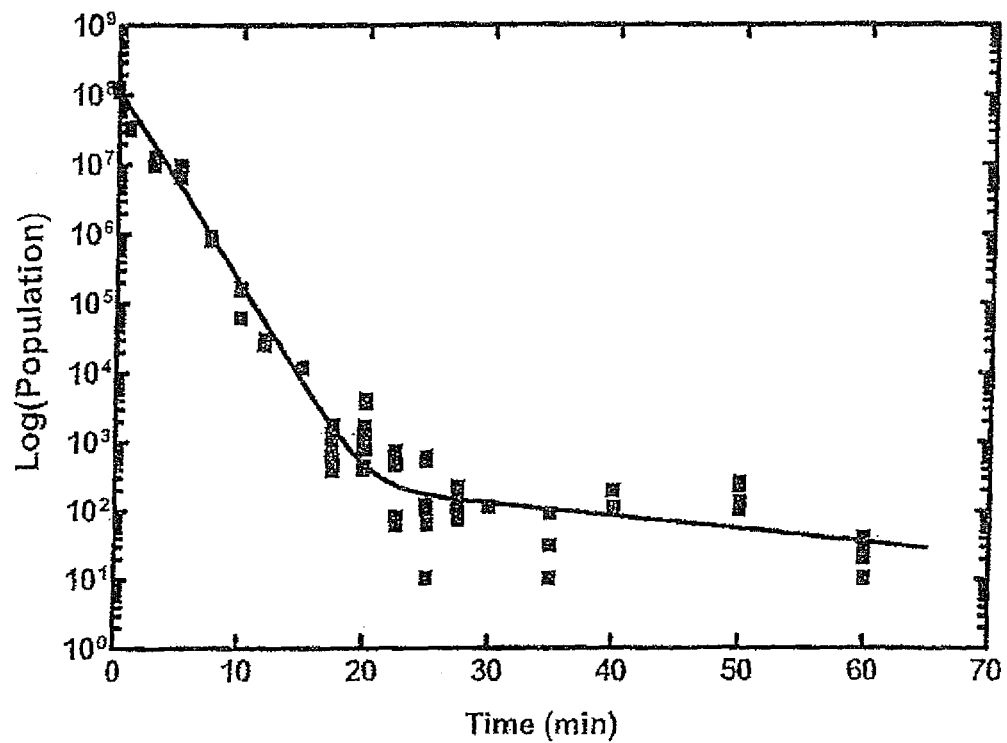
FIG. 5 is a semi-log graphical plot of a population of *L. monocytogenes* bacteria subjected to a pressure of 60,000 psi and a temperature of 20° C. against time (min)

FIG. 5 is an exemplary semi-log graphical plot of a population of Listeria monocytogenes (L. monocytogenes) bacteria subjected to a pressure of 60,000 psi and a temperature of 20° C. against time (in minutes). With specific reference to FIG. 5, a third set of microorganism population data versus time is shown, and that data clearly exhibits tailing. Here, the response of the bacterium L. monocytogenes to lethal conditions of high pressure processing shows only inactivation kinetics, declining from the initial inoculum level without an appreciable lag time ($\lambda=0$), but not falling completely to zero. This kinetics behavior is typical for this strain of baro-resistant L. monocytogenes and for resistant bacterial spores. The inactivation tailing data was modeled with the full set of rate equations shown in the table of FIG. 1. With only 24 data pairs, the curve drawn by program SD would not be smooth. Therefore, the curve shown in FIG. 5 is one that is generated using the program function PredODE of MATLAB® to obtain a smoother curve.

Returning to FIG. 2, the method of the invention models behavior showing continuous growth-decline (and growth-decline-tailing, as in FIG. 3), as well as nonlinear decline-only kinetics, such as that exhibited by the population curve at the lowest temperature measured, which declines after a significant lag period. The inventive method of modeling microorganism population dynamics does not favor one region (or phase) of the bacterial lifecycle over another, does not patch together different regions of the bacterial lifecycle using separate models to construct a full curve, and does not exclude regions of the bacterial lifecycle or subjectively eliminate unwanted data points to obtain an accurate and meaningful fit of the data. Instead, the inventive method is unbiased in modeling the complete set of experimentally measured microorganism population dynamics with continuous, on-going kinetics processes that sum to a smooth continuous simulation of the entire observed kinetic behavior without imposing a priori assumptions to constrain the data or to force the data to conform to prescribed assumptions that could compromise the estimated values of the model's parameters and the safe shelf-life of the product.

An advantage of the method of the invention is that the model comprises quasi-chemical steps, each with a rate equation. In a manner similar to the description of chemical and biochemical kinetics, aspects of the population dynamics, such as growth and death, are described by quasi-chemical reactions, rate equations and rate constants. Thus, parameters used in other models such as birth rate do not have a suitable place in microbial reproduction by asexual cell division, and presently they are superceded by quasi-chemical rate constants to thereby provide several advantages. For example, the accuracy of the overall curve simulation is advantageously available from the difference between each data point and the value of the calculated population (U) at that point, referenced to by those knowledgeable in the art of curve-fitting as a residual or error. A further advantage is that by altering the values of one or more quasi-chemical rates, and by examining the effect of this change on the overall behavior, the user can evaluate the meaningfulness and accuracy of each parameter in the model. The entire series of growth-death and nonlinear death-only curves in FIG. 2 does not exhibit tailing, and reactions 5 and 6 shown in the table of in FIG. 1 can be effectively eliminated from the model by setting and maintaining rate parameter $k_5$ approximately equal to zero throughout the curve fitting process without compromising the ability of the model to fit this data accurately. It is obvious that other suitable modifications can be made to limit the number of parameters for the sake of parsimony in circumstances when the data to be fit by the model does not show the full range of kinetics behaviors accessible by the Quasi-chemical model in FIG. 1.

The net growth G is given by the expression $G=k_2-k_4$. With G positive (i.e., $G>0$), it is possible to fix the values of $k_1$, $k_2$, $k_4$ and $k_5$, and incrementally change the values of $k_3$ from 0 to any positive value, such as 1,000. A simulation with $k_3=0$ leads to unrestrictedly increasing growth over the entire time range, which is unobserved experimentally, providing justification for the necessity to introduce extra-cellular metabolic factors into the mechanism defining the core of the model, such as E, such that the model can account for growth-death kinetic behavior. With reference to FIG. 2, it should be appreciated that with no evidence of tailing, maintaining $k_5 \approx 0$ provides an excellent fit with meaningful rate parameters. With non-zero values of $k_3$, pulse-like behavior, i.e., the presence of a maximum in the population curve is exhibited. The observed maximum implies that a maximum rate of population change occurs during the earlier exponential growth phase. This value, and the effect of each Quasi-chemical kinetics rate and rate constant on this parameter, is also available from the method of the invention, such as by numerically differentiating the population curve (U(t) against (t) and solving for the inflection point. With reference to FIGS. 2 and 5, it should be noted that curves such as 15° C. (see FIG. 2) and the *L. monocytogenes* curve (see FIG. 5) occur only when G<O.

Predictions such as the existence of growth/no growth boundaries and the processing time required to reduce the population of a microorganism to any desired level are a further advantage of the invention. For example, it is a simple matter to predict when a curve of population against time falls below any desired level.

A novel feature of the method of the invention is that the entire dynamical population curve is simulated in a non-piecemeal manner. This advantageous feature becomes apparent with reference to FIG. 2, FIG. 3, and FIG. 5, which together combine to display five sets of experimental population-time data showing non-linear kinetics in data pairs at different sets of conditions. The curves in FIG. 2 were taken at three different temperatures, for instance, and exhibit all the characteristics of real systems: typical reproducible data albeit with experimental error, lag time, maximum growth (or death) rate, maximum population, decline, and trends between data sets.

The method of the invention provides a fitted data curve of U(t) against time (t) that simulates the data for this and all such measured time-dependent microorganism populations. A further advantageous novel feature of the method of the invention is that the curves of population against time are not limited to total observed population vs. time. That is, the time-dependences of all the modeling parameters representative of the microorganism species populations in the model (Q, M, D, and R) are available in the output data of the computer, along with the concentration of the extra-cellular lethality factor, E.

Moreover, the method of the invention advantageously provides many new types of analysis of the population dynamics of microorganisms not previously available to food technologists familiar with the art of producing reliable and reproducible (within experimental error) population data against time. Most notable among the new types of analysis methods is the construction of phase-plane plots, for example, interrelating M (the population of viable, dividing cells) and E (the extra-cellular death factor). The method of the invention also advantageously provides, as alluded to above, a systematic variation of parameters with examination of the result on the overall kinetics curve, and permits examination of the behaviors of the curves of each individual component of the model. It is possible to investigate the behavior of the model around the time of inoculation (t→0) and the behavior at times long relative to the microorganism's fission time (t→∞).

The method of the invention thus provides a way to evaluate microorganism population dynamics without invoking strategies describing the reproduction of alien species or organisms, or without patching together discontinuous, unrelated equations each of which approximate only a portion of the observed dynamical behavior. The Quasi-chemical kinetics model logically derives its solutions from a minimum set of representative basic biological processes of microorganisms. When implemented using a well-developed, high performance software program for technical computing, such as the MATLAB® scientific software, the Quasi-chemical kinetics model of bacterial growth and/or death can describe population-time curves accurately, and enable food technologists, people in the pharmaceutical industry and other health workers to make reliable predictions of future microbial behavior under a variety of conditions that may be described as conducive, stressful, or lethal to microorganisms.

It is to be understood that the disclosed invention is not limited by the order or sequence of quasi-chemical reactions that constitute the model. While the model can be expanded to include additional steps that more fully detail the underlying biochemical and biological processes occurring in the microorganism, the introduction of such additional steps would necessitate the introduction of additional model parameters. The additions of large numbers of variables and parameters may not offer an improvement to the performance of the model using the minimal set of parameters, and using a less parsimonious model may call into question the accuracy of values estimated for superfluous parameters. Interchanging the fourth and first reactions shown in the table of FIG. 1, for example, does not affect simulation of the data. The use of different symbols to represent the quasi-chemical species, such as "A" or some other symbol to represent the extra-cellular lethality factor, does not affect the nature of the model. Moreover, it is to be understood that symbols such as "M" and "D" represent well-defined components of a microorganism population. The model can be modified, however, without changing the nature and utility of the invention. For example, the term microorganism can include bacterium, bacterial spore, protozoa, virus, or fungus. Quasi-chemical reactions can be added, as well as removed, vide supra, setting $k_3 = 0$ removes the third reaction (see FIG. 1). For example, the reaction M+E→D can be replaced by two reactions and an additional species, i.e., M+E→X→D, without compromising the ability of a user familiar with applying curve-fitting techniques to food technology, food safety, or public health issues to use the method of the invention to analyze reliable microorganism population data.

Figure 6:
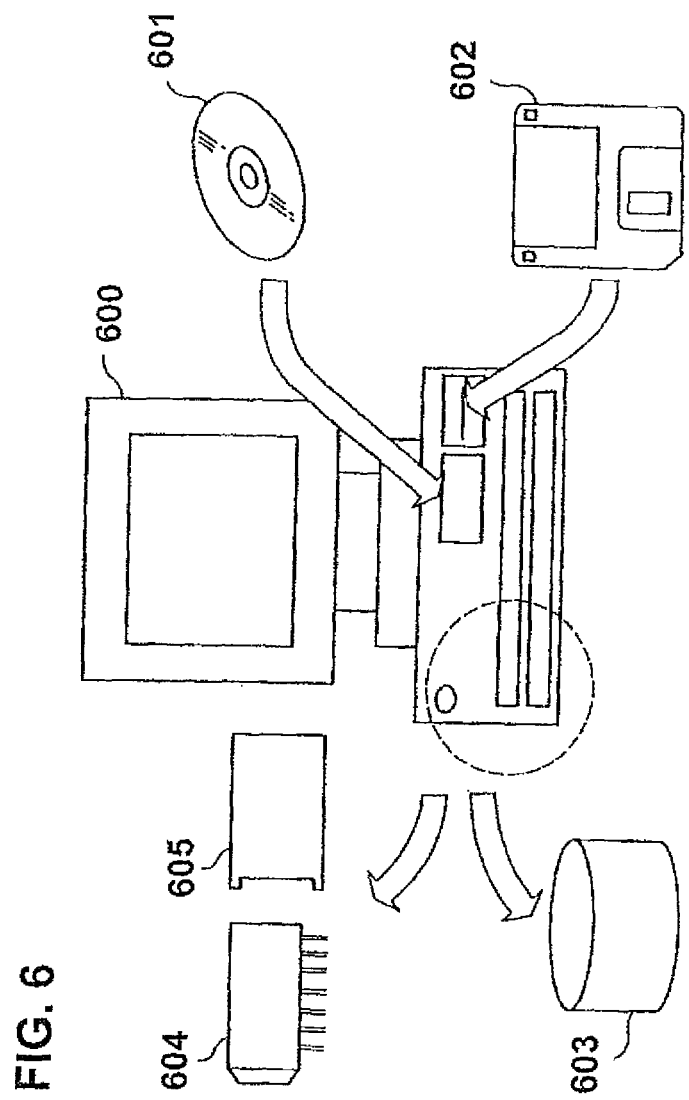
FIG. 6 is a block diagram of an exemplary computer system in which the method of the invention is implemented.

FIG. 6 is a block diagram of an exemplary computer system in which the method of the invention is implemented. The claimed invention is described above with reference to a flowchart illustration of methods and computer program products according to various aspects of the invention. It will be understood that each functional block of the flowchart illustration, and combinations of functional blocks in the flowchart illustration, respectively, can be implemented by computer program instructions. These computer program instructions may be loaded onto a general purpose computer 600, special purpose computer, or other programmable data processing apparatus to produce a machine, such that the instructions that execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto the computer 600 or other programmable data processing apparatus to cause a series of operational steps to be performed on the computer 600 or other programmable apparatus to produce a computer-implemented process such that the instructions that execute on the computer or other programmable apparatus provide steps for implementing the functions specified in the flowchart block or blocks.

As a computer processing device, any suitable device for performing computations in accordance with the computer program may be used. Examples of such devices include the general personal computer 600, a laptop computer having a microprocessor, a programmable logic device, a microprocessor and/or an application specific integrated circuit.

Accordingly, functional blocks of the flowchart illustration support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems that perform the specified functions or steps, or suitable combinations of special purpose hardware and computer instructions.

Moreover, in the specification, the term "media" includes, for instance, a disk shaped media 601 such as CD-ROM (compact disc-read only memory), magneto optical disc or MO, digital video disc-read only memory or DVD-ROM, digital video disc-random access memory or DVD-RAM, a floppy disc 602, a memory chip 604 such as random access memory or RAM, read only memory or ROM, erasable programmable read only memory or E-PROM, electrical erasable programmable read only memory or EE-PROM, a rewriteable card-type read only memory 605 such as a smart card, a magnetic tape, a hard disc 603, and any other suitable means for storing a program therein.

Thus, while there are shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice.

What is claimed is:

1. A method for determining the safety and shelf-life of a storable food product for consumption using a microbiological Quasi-chemical kinetics growth-death tailing model based on differential equations, comprising:
   collecting, over time, from a microbial population within a storable food product, a plurality of samples;
   inputting, into a computer comprising a microprocessor executing instructions stored on the computer, a plurality of time-dependent microbial data from the plurality of samples, the plurality of time-dependent microbial data comprising a plurality of pairs of microbial counts with respect to time;
   modeling a storable food product composition, said modeling comprising:
   inputting, into the computer, experimentally measured data pair vectors comprising time (td) vector and corresponding population count (xd) vector;
   inputting, into the computer, initial values of rate constant estimates comprising a k-vector of at least six numerical values ($k_1$, $k_2$, $k_3$, $k_4$, $k_5$, $k_6$ . . . $k_n$);
   storing each of the td vector, xd vector and k-vector values in memory of the computer for use in a Quasi-chemical kinetics growth-death-tailing model wherein the model is defined by five rate equations derived from a hypothetical mechanism of reaction steps of biochemical processes:

| Reaction Steps | Rate equations |
|---|---|
| Q → M | $dQ/dt = -(v_1 + v_5) = (k_1 + k_5)Q$ |
| M → 2M + E | $dM/dt = v_1 + v_2 - v_3 - v_4 = k_1Q - M(G - \varepsilon E)$ |
| M + E → D | $dE/dt = (v_2 - v_3) = M(k_2 - \varepsilon E)$ |
| M → D | $dD/dt = (v_3 + v_4 + v_6) = M(k4 + \varepsilon E) + k_6R$ |
| Q → R | $dR/dt = (v_5 - v_6) = k_5Q - k_6R$ |
| R → D | | where Q represents quiescent organisms, M represents cells activated for cell division and multiplication, E is an extracellular lethality factor, cells, D is dead cells, and R represents cells with increased resistance,
selecting a non-linear curve-fitting routine stored in the memory of the computer;
repeatedly:
   integrating, in the microprocessor of the computer, the Quasi-chemical kinetics growth-death-tailing model with each of the td vector, xd vector and k-vector values to obtain a calculated population data (U) using the non-linear curve-fitting routine; and
   varying each of k-vector values ($k_1$, $k_2$, $k_3$, $k_4$, $k_5$, $k_6$ . . . $k_n$);
comparing the calculated population data (U) to the measured td vector and xd vector values until a predetermined fitting criterion is reached that signifies no further meaningful improvement has occurred to achieve a curve-fit and thereby signifies a fit of the model to the td vector and xd vector values; and
rendering a user interface for display to a user, the user interface facilitating reviewing the informational composite of the curve-fit to determine whether the storable food product is safe for consumption;
delivering, as an input to control a food processing technology or a temperature-controlled food storage technology, an output of the computer comprising the storable food product as a microbiologically safe food product with a date of use after which the microbiologically safe food product needs to be destroyed.

2. The method of claim 1, wherein the steps of repeatedly integrating and varying comprise:
   comparing the calculated population data to the experimentally obtained measured data pair vectors;
   changing specific numerical values of the k-vector to minimize a difference between compared experimentally measured data pair vectors and the calculated population data for all data pairs of the k-vector;
   wherein said integrating, comparing and changing are iterated until a predetermined fitting criterion is obtained, said predetermined fitting criterion representing attainment of an optimal curve fit of the calculated population data compared with the experimentally determined population data on the screen of the computer.

3. The method of claim 1, wherein the informational composite comprises a graphical plot of the pre-stored experimentally obtained measured data, a graphical plot of calculated data values at identical times as data points of the pre-stored experimentally obtained measured data, a listing of k-vector values used to generate a fitted curve, and an estimate of an overall error in the fitting.

4. The method of claim 3, wherein the graphical plot of measured data comprises a log-log or log-time graphical plot of the measured experimental data pair vectors.

5. The method of claim 3, wherein the graphical plot of calculated values comprises a log-log plot of the calculated values.

6. The method of claim 1, further comprising:
entering an additional command to obtain a smoother curve of the calculated population based on a computation of additional population time pair vectors.

7. The method of claim 1, further comprising using the model to guide the manufacturing of the storable food product where the storable food product has been determined safe for consumption.

8. The method of claim 1, wherein the food processing technology includes a system to perform at least one of thermal processing, high-pressure processing, pulsed-electric-field processing, irradiation processing, chemical-agent processing, or ultraviolet processing.

9. A method for determining whether a storable food product is safe for consumption using a model that predicts microbial growth or processing conditions to ensure microbial destruction and assure consumer safety, comprising:
inputting, into a computer comprising a microprocessor executing instructions stored on the computer, a plurality of time-dependent microbial data from a plurality of samples collected over time from a microbial population within a stored product, the plurality of time-dependent microbial data comprising a plurality of pairs of microbial counts with respect to time;
Inputting, into the computer, experimentally measured data pair vectors comprising time (td) vector and corresponding population count (xd) vector;
Inputting, into the computer, initial values of rate constant estimates comprising a k-vector of at least six numerical values ($k_1, k_2, k_3, k_4, k_5, k_6 \ldots k_n$);
storing each of the td vector, xd vector and k-vector values in memory of the computer for use in a Quasi-chemical kinetics growth-death-tailing model wherein the model is defined by five rate equations derived from a hypothetical mechanism of reaction steps of biochemical processes:

| Reaction Steps | Rate equations |
| --- | --- |
| Q → M | $dQ/dt = -(v_1 + v_5) = (k_1 + k_5)Q$ |
| M → 2M + E | $dM/dt = v_1 + v_2 - v_3 - v_4 = k_1Q - M(G - \varepsilon E)$ |
| M + E → D | $dE/dt = (v_2 - v_3) = M(k_2 - \varepsilon E)$ |
| M → D | $dD/dt = (v_3 + v_4 + v_6) = M(k4 + \varepsilon E) + k_6R$ |
| Q → R | $dR/dt = (v_5 - v_6) = k_5Q - k_6R$ |
| R → D | | where Q represents quiescent organisms, M represents cells activated for cell division and multiplication, E is an extracellular lethality factor, cells, D is dead cells, and R represents cells with increased resistance,
repeatedly:
integrating in the microprocessor of the computer the Quasi-chemical kinetics growth-death-tailing model with each of the td vector, xd vector and k-vector values to obtain a calculated population data (U) using the non-linear curve-fitting routine; and
varying each of k-vector values ($k_1, k_2, k_3, k_4, k_5, k_6 \ldots k_n$);
comparing the calculated population data (U) to the measured td vector and xd vector values until a predetermined fitting criterion is reached that signifies no further meaningful improvement has occurred to achieve a curve-fit and thereby signifies a fit of the model to the td vector and xd vector values; and
predicting the microbial growth or survival in response to processing conditions based on a displayed informational composite of the curve-fit of the calculated population data on a screen of the computer to ensure that the informational composite indicates that microbial destruction will occur; and
controlling operation of a food processing technology or temperature-controlled storage technology using the informational composite to determine whether the storable food product is safe for consumption.

10. The method of claim 9, further comprising the step of:
wherein the steps of repeatedly integrating and varying comprise:
comparing the calculated population data to the experimentally obtained measured data pair vectors;
changing specific numerical values of the k-vector to minimize a difference between compared experimentally measured data pair vectors and the calculated population data for all data pairs of the k-vector;
wherein said integrating, comparing and changing are iterated until a predetermined fitting criterion is obtained, said predetermined fitting criterion representing attainment of an optimal curve fit of the calculated population data compared with the experimentally determined population data on the screen of the computer.

11. The method of claim 9, wherein the informational composite comprises a graphical plot of the pre-stored experimentally obtained measured data, a graphical plot of calculated data values at identical times as data points of the pre-stored experimentally obtained measured data, a listing of k-vector values used to generate a fitted curve, and an estimate of an overall error in the fitting.

12. The method of claim 11, wherein the properties of the fitted curve are evaluated to determine lag times, growth or death rates, or processing times.

13. The method of claim 11, wherein the values of lag times, growth or death rates, and processing times are mathematically interrelated with environmental parameters to allow predictions of microbial growth or survival in response to environmental parameters such as conditions which were not measured experimentally.

14. The method of claim 9, further comprising:
entering an additional command to obtain a smoother curve of the calculated population on the screen of the computer based on a computation of additional population time pair vectors.

15. The method of claim 11, wherein the environmental parameters comprise one of pH, water activity, storage temperature, high pressure processing conditions and high temperature processing conditions.

16. The method of claim 9, further comprising using the model to guide the manufacturing of the storable food product where the storable food product has been determined safe for consumption.

17. The method of claim 9, wherein the food processing technology includes a system to perform at least one of thermal processing, high-pressure processing, pulsed-electric-field processing, irradiation processing, chemical-agent processing, or ultraviolet processing.

* * * * *